(12) United States Patent
Sun (10) Patent No.: US 9,245,194 B2
(45) Date of Patent: Jan. 26, 2016

(54) EFFICIENT LINE DETECTION METHOD (75) Inventor: Zehang Sun, Cupertino, CA (US)

(73) Assignee: Apple Inc., Cupertino, CA (US)

(*) Notice: Subject to any disclaimer, the term of this patent is extended or adjusted under 35 U.S.C. 154(b) by 714 days.

(21) Appl. No.: 13/366,613

(22) Filed: Feb. 6, 2012

(65) Prior Publication Data

US 2013/0201358 A1 Aug. 8, 2013

(51) Int. Cl.
*H04N 5/228* (2006.01)
*G06K 9/32* (2006.01)
*G06K 9/46* (2006.01)
*G06T 7/00* (2006.01)

(52) U.S. Cl.
CPC ............ *G06K 9/3275* (2013.01); *G06K 9/4604* (2013.01); *G06T 7/0085* (2013.01); *G06T 2207/20061* (2013.01); *G06T 2207/20136* (2013.01)

(58) Field of Classification Search
CPC .. G06K 9/3275; G06K 9/4604; G06T 7/0085; G06T 2207/20136; G06T 2207/20061
USPC ............ 348/222.1, 241, 252, 208.6; 382/254, 382/258, 260, 263, 266, 268, 269
See application file for complete search history.

(56) References Cited

U.S. PATENT DOCUMENTS

| 7,151,863 B1* | 12/2006 | Bradley et al. | 382/299 |
| 2008/0292194 A1* | 11/2008 | Schmidt et al. | 382/217 |
| 2011/0229029 A1* | 9/2011 | Kass | 382/168 |
| 2012/0218427 A1* | 8/2012 | Wu | 348/208.6 |

OTHER PUBLICATIONS

Bonci, A., et al., "A Bayesian Approach to the Hough Transform for Line Detection," IEEE Transactions on Systems, Man, and Cybernetics—Part A: Systems and Humans, vol. 35, No. 6, Nov. 2005, 11 pages.

Xu, Lei, et al., "A New Curve Detection Method: Randomized Hough Transformation (RHT)," Pattern Recognition Letter 11 (1990) 331-338, North Holland, May 1990, 8 pages.

"CS425 Lab: Edge Detection and Transform," http://cs.uregina.ca/Links/class-info/425/Lab4/index.html, printed May 6, 2002, 10 pages.

Yu, Chen (Indiana University), "Canny Edge Detection and Hough Transform," Power Point Presentation dated Feb. 21, 2010, 8 pages.

O'Gorman, F., et al., "Finding Picture Edges through Collinearity of Feature Points," Laboratory of Experimental Psychology, University of Sussex, Brighton, Sussex, England, Session 21 Computer Vision, Proc. 3rd Int. Joint. Conf. Artificial Intelligence, pp. 543 555 (1973), 13 pages.

* cited by examiner

*Primary Examiner* — Twyler Haskins
*Assistant Examiner* — Carramah J Quiett
(74) *Attorney, Agent, or Firm* — Blank Rome LLP (57) ABSTRACT

An efficient line detection technique pre-processes an image to remove edge pixels that are not on straight lines, before performing line detection. By removing edge pixels not on straight lines, the complexity of the task of line detection can be significantly reduced, while increasing the accuracy. Various embodiments preprocess the edge maps of an image by anisotropic line filtering, kernel density estimation-based edge pruning, and connected component analysis. The resulting pruned edge map may then be processed using a Hough transform to detect straight lines in the image, having removed much of the noise in the edge map.

23 Claims, 13 Drawing Sheets

EFFICIENT LINE DETECTION METHOD

BACKGROUND

Figure 1:
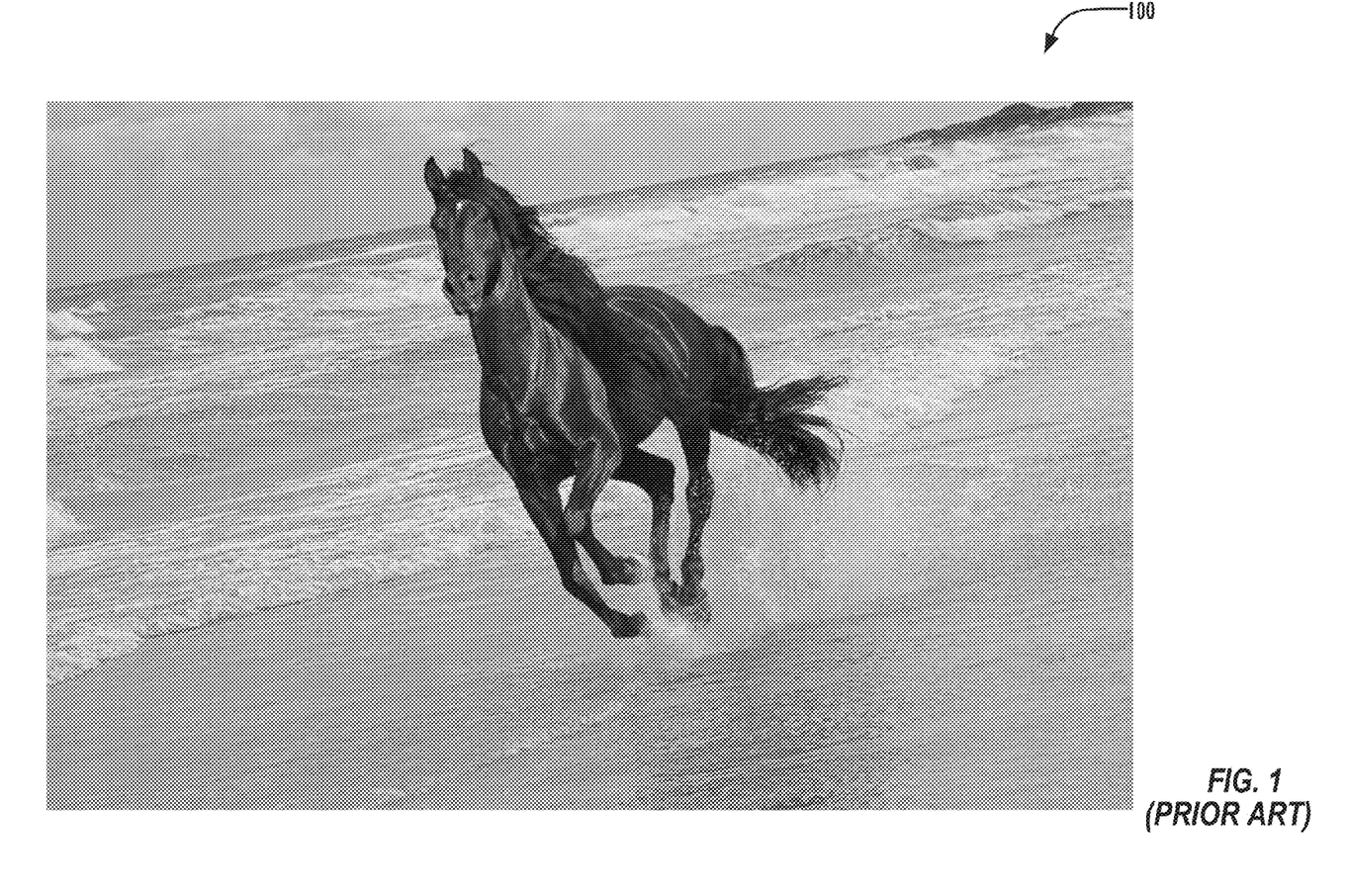
FIG. 1 is an image captured by an image capture device according to the prior art
Figure 2:
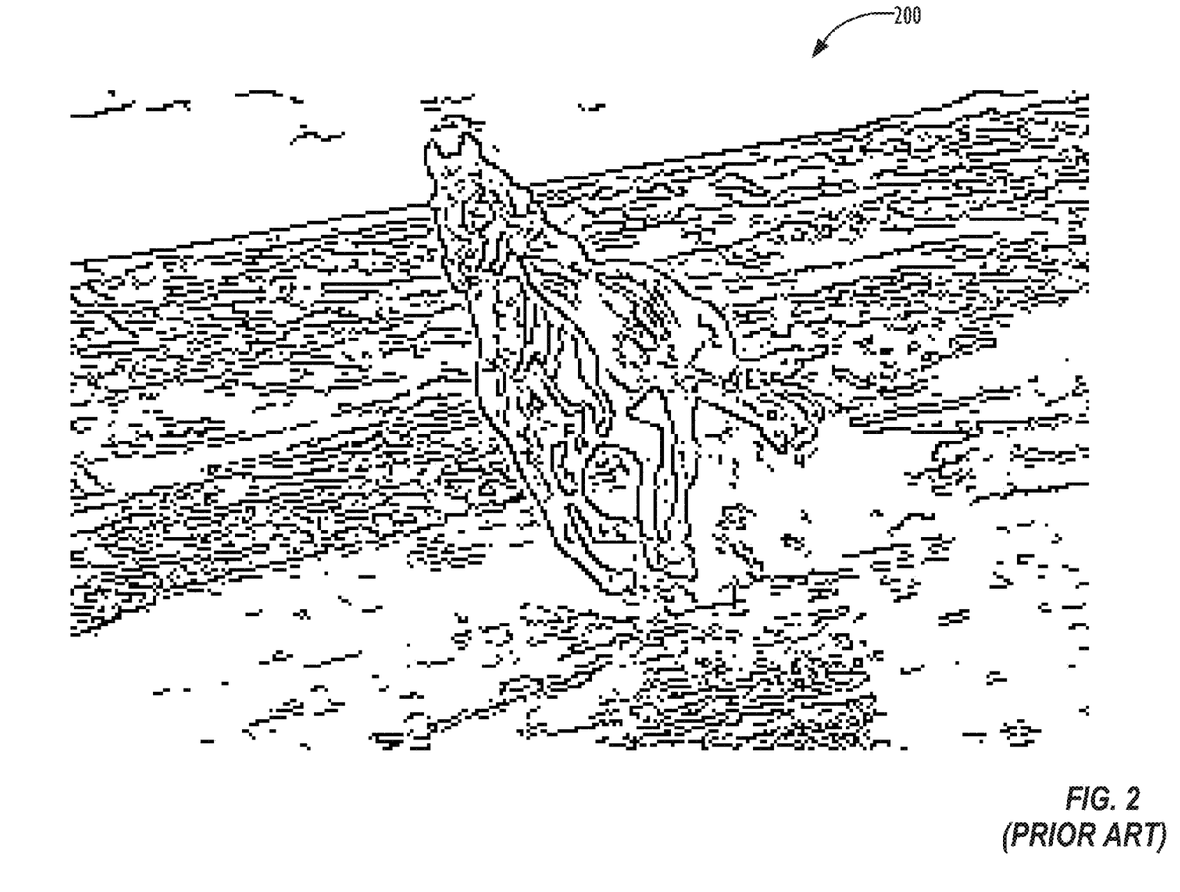
FIG. 2 is an edge map generated from the image of FIG. 1 according to the prior art.

This disclosure relates generally to the field of image processing. More particularly, but not by way of limitation, it relates to a technique for detecting lines in an image. Existing techniques for line detection in images have both speed and accuracy problems. In the context of line detection, any non-collinear pixel is typically considered as noise data. Prior art line detection techniques, however, typically do not differentiate collinear edges from non-collinear edges, and introduce many spurious lines. FIG. 1 is an example image and FIG. 2 is an edge map that illustrates this difficulty, with a large number of edges detected (hi this example by a Canny edge detector). Analyzing all of the edges in FIG. 2 for lines, typically using Hough transforms, is expensive and subject to errors caused by the spurious lines.

Figure 3:
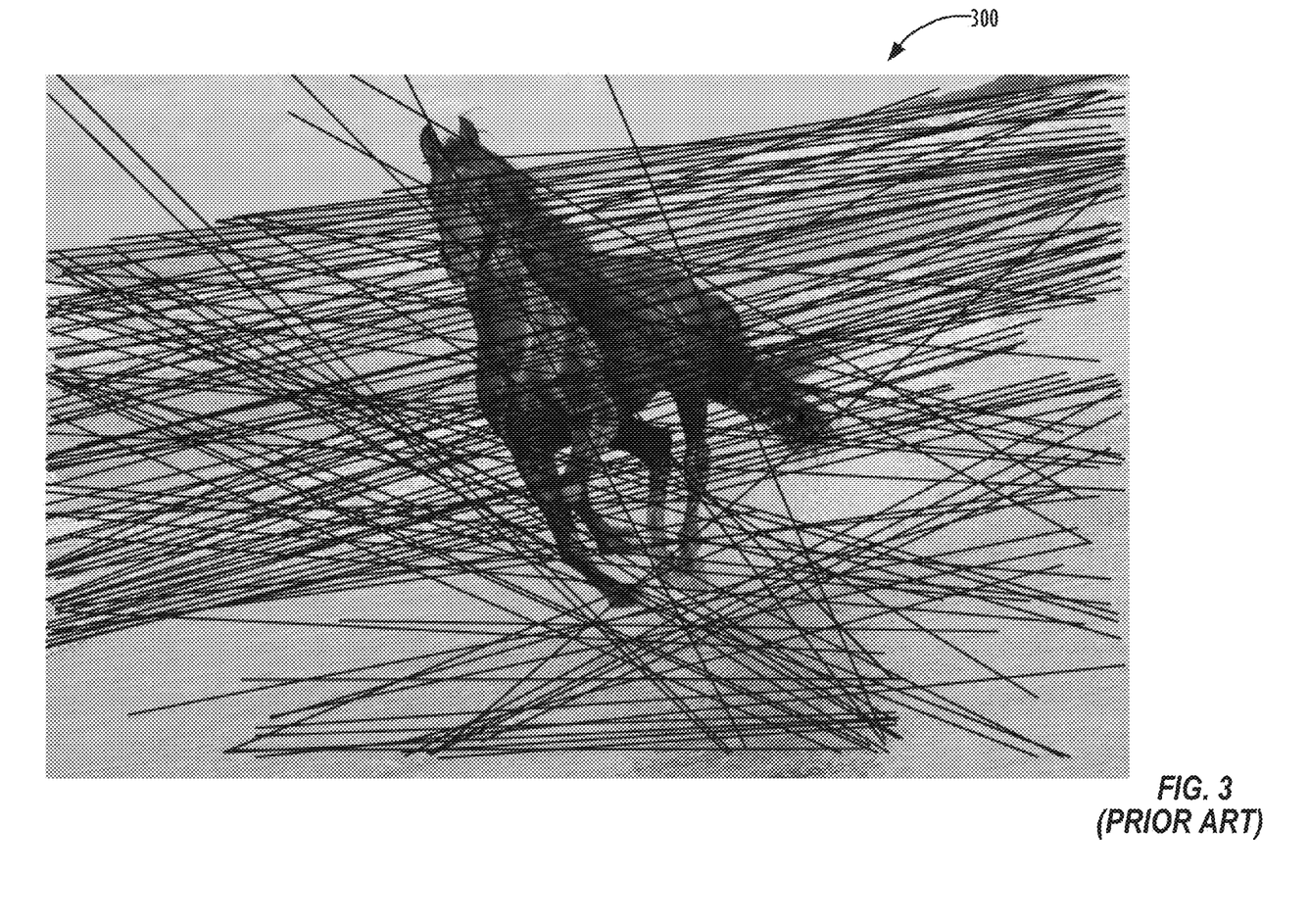
FIG. 3 is an image illustrating lines detected by a line detection technique from the edge map of FIG. 2 according to the prior art.

Knowledge about the lines in an image is useful in many image analysis applications. Hough transforms (HT) are a classical tool in image processing to find lines. Hough transforms take an edge map of an image as input and perform a "voting" process using:

$$\rho = x \times \cos\theta + y \times \sin\theta$$

where $\rho$ is the perpendicular distance from the origin and $\theta$ is the angle with the normal. Collinear points $(x_i, y_i)$ with $i=1, \ldots, N$ are transformed into N sinusoidal curves $$\rho = x_i \times \cos\theta + y_i \times \sin\theta$$

in the $(\rho, \theta)$ plane, which intersect in the point $(\rho, \theta)$. Hough transforms involve trigonometric operations on every edge pixel and every angle in the Hough space, are very CPU and memory demanding. If the image is texture rich, the true line detections are typically drowned inside the false detection pool, such as is illustrated by the lines of image 300 of FIG. 3.

SUMMARY

An efficient line detection technique pre-processes an image to remove edge pixels that are not on straight lines, before performing line detection. By removing edge pixels not on straight lines, the complexity of the task of line detection can be significantly reduced, while increasing the accuracy. Various embodiments described below preprocess the edge maps of an image by anisotropic line filtering, kernel density estimation-based edge pruning, and connected component analysis. The resulting pruned edge map may then be processed using a Hough transform to detect straight lines in the image, having removed much of the noise in the edge map.

In one embodiment, a method of detecting lines in an image is disclosed. The method includes pre-processing the image using a processor before detecting a line in an edge map of the image. Pre-processing the image includes generating an edge map of the image and removing non-collinear edge pixels from the edge map.

In another embodiment, a non-transitory program storage device is disclosed. The non-transitory program storage device is readable by a programmable control device, and comprises instructions stored thereon for causing the programmable control device to receive an image from an image sensor; pre-process the image using a processor, and detect a line in an edge map of the image. The instructions for causing the programmable control device to pre-process the image include instructions for causing the programmable control device to convert the image into an edge map of the image and prune non-collinear edge pixels from the edge map.

In yet another embodiment, an apparatus is disclosed. The apparatus includes an image sensor; a programmable control device; a memory coupled to the programmable control device, wherein instructions are stored in the memory. The instructions stored in the memory cause the programmable control device to pre-process the image using a processor and detect a line in the edge map with a Hough transform. The instructions to pre-process the image include instructions that cause the programmable control device to generate an edge map of an image captured by the image sensor; filter the edge map using an anisotropic line filter; perform a density analysis of the edge map; and perform a connected component analysis of the edge map.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although the present disclosure is written in terms of handheld personal electronic image capture devices, the techniques described below may be implemented in other types of devices, such as traditional digital cameras. In the discussion below, an edge is defined as a discontinuity in an intensity gradient, and an edge pixel is defined as a pixel location of the gradient discontinuity, typically expressed in row, column coordinates.

In general, pre-processing is performed on the edge map of the image to reduce the noise data in the edge map. By removing the nose of non-collinear edge pixels from the Hough space voting, the Hough filter can be more efficient, and less likely to detect unwanted lines.

In one embodiment, three pre-processing steps are used to remove the noise pixels: (a) anisotropic line filtering, (b) kernel density estimation based edge pruning, and (c) connected component analysis.

Figure 4:
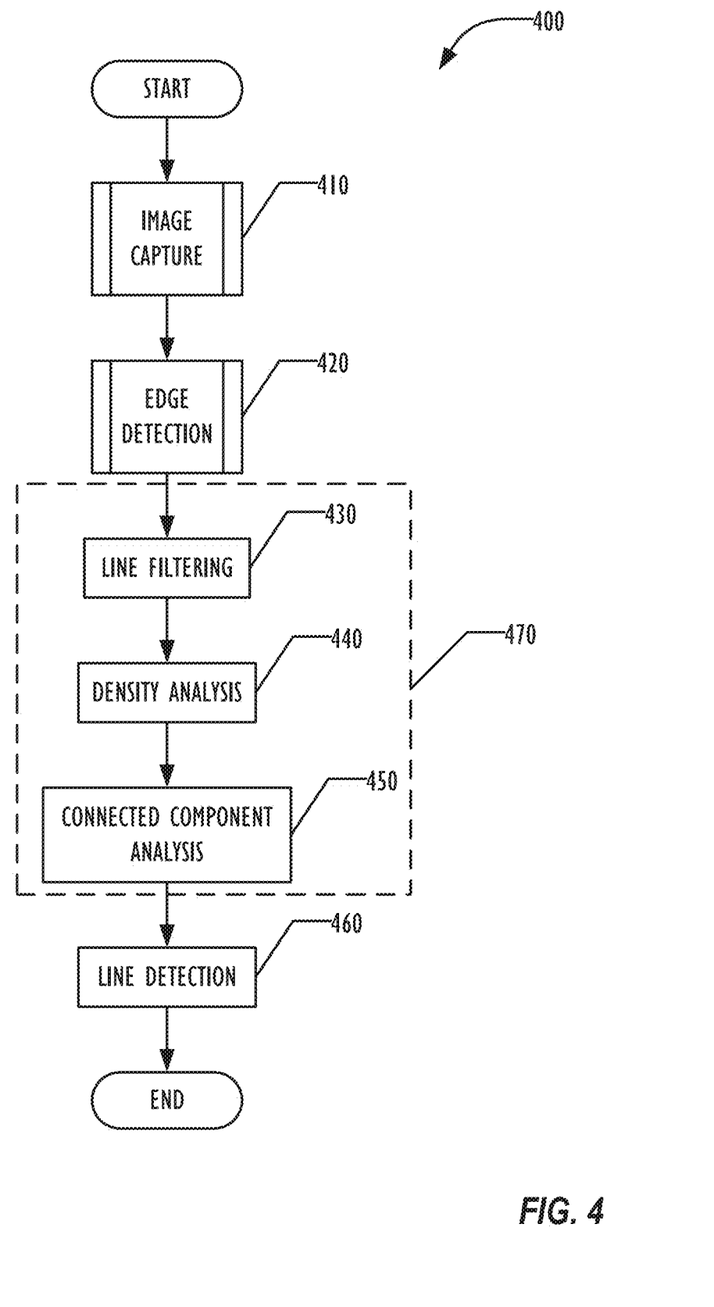
FIG. 4 is a flowchart illustrating a technique for detecting ones in an mage according to one embodiment.
Figure 13:
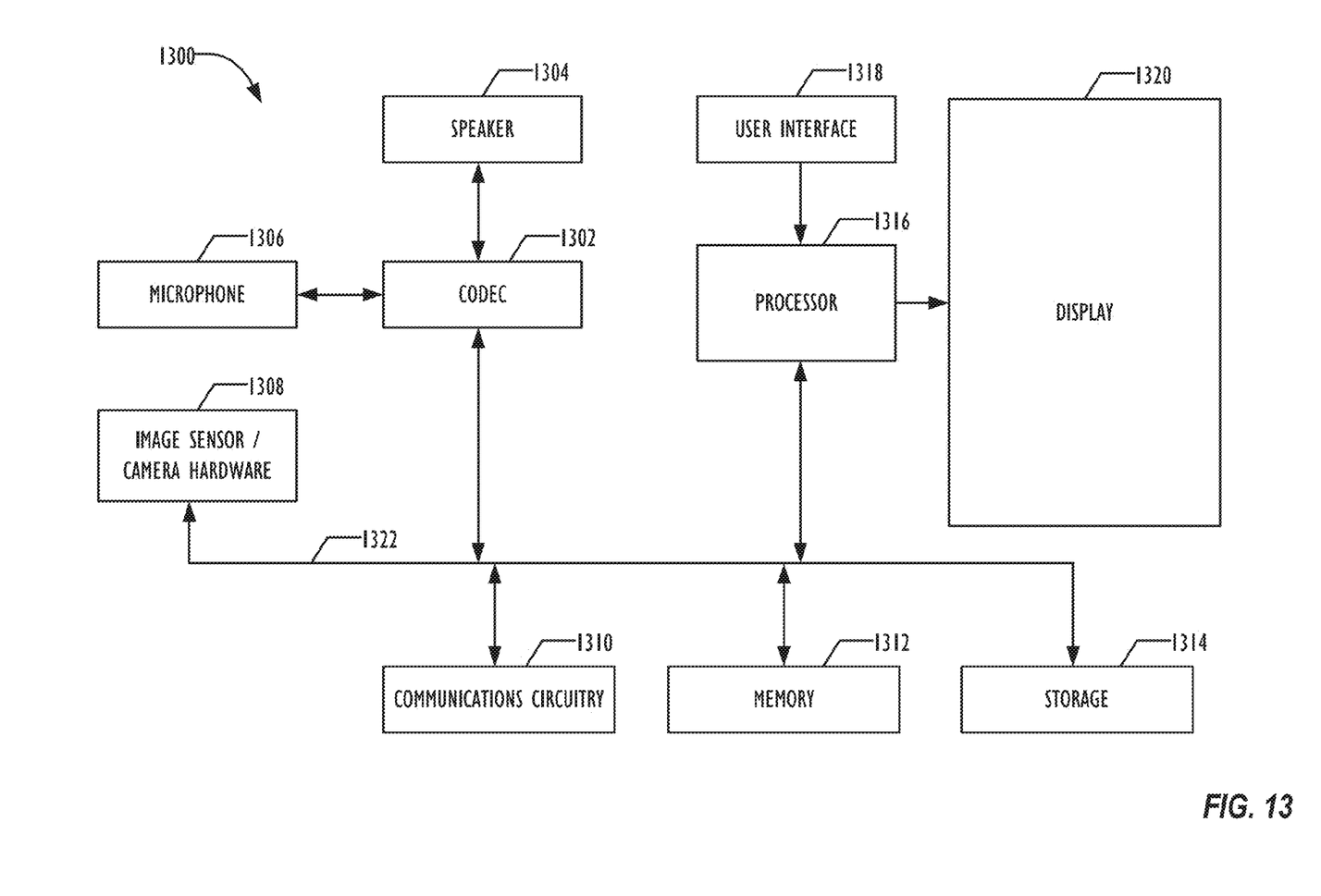
FIG. 13 is a block diagram illustrating an electronic device for implementing the techniques described herein according to one embodiment.

FIG. 4 is a flowchart illustrating a technique 400 for detecting lines in an image according to one embodiment. To begin, in block 410 an image capture device captures an image, such the image 100 of in FIG. 1. Although as illustrated in this disclosure as a grayscale image, the image 100 typically is captured as a color image, and may be converted into a grayscale image using any desired technique, or may be processed as a color image without grayscale conversion. Any image capture device may be used for capturing the image, using any desired capture technique. One such device is discussed below in the discussion of FIG. 20. The image capture technique is not discussed further herein.

In block 420, an edge detection technique is performed on the captured image, producing an edge map of edge pixels, such as the edge map 200 that is illustrated in the example of FIG. 2. Any desired edge detection technique may be used. One commonly used edge detection technique is a Canny edge detection technique.

Block 470 comprises a pre-processing phase of the line detection technique 400. Although as illustrated in FIG. 4, pre-processing phase 470 includes line filtering (430), density analysis (440), and connected component analysis (450), other techniques for removing the noise of non-collinear edge pixels from the edge map may be used.

After the edge map 200 has been pre-processed in block 470, a line detection technique is performed on the pruned edge map in block 460. In one embodiment, a progressive probabilistic Hough transform is used for line detection. Any Hough transform variant or any other line detection technique may be used as desired.

Pre-Processing Phase (470)

The line filtering of block 430 is based on the observation that a line edge pixel generally has more strong edge pixels in its neighboring region along the direction of the line than along the direction perpendicular to the line. Kernel density estimation based edge pruning, as illustrated in block 440, takes advantage of the edge pixel orientation information, and the observation that edge pixels on a straight line have a similar edge gradient angle.

If the distribution of gradient angles of an image is fitted to a probability density function (PDF), the peaks of the PDF are a good indicator of the existence of a line. Using the PDF, every edge pixel in the edge map may be assigned a likelihood value indicating the confidence level if the edge pixel belonging to a particular peak (possibly a line). By pruning edge pixels that do not have a high confidence level that the edge pixels do not belong to a line, the line detection of block 460 may be more efficient and accurate.

In addition, the locations of the peaks disclose an approximated line orientation. If lines along a particular orientation are desired, the line detection search may be limited to only those lines with the desired orientation, leading to significant gains in both speed and accuracy.

After line filtering in block 430 and kernel density estimation based edge pruning in block 440, the edge map still includes true line edge pixels, as well as some non-collinear edge pixels that survive the two filters. But the filtering results in many fewer non-collinear edge pixels, and most of the non-collinear edge pixels are broken into very small connectivity groups. Thus applying connected component analysis in block 450 may yield many very small connected components, while the collinear component shows strong connectivity. Thus additional noise edge pixels may be removed using connected component analysis in block 450.

The order of the pre-processing steps is significant. If the PDF based pruning of block 440 is applied directly onto an edge map before the anisotropic line filtering of block 430, the most prominent peaks on the PDF may not associate with lines for most of natural images, because the number of edge pixels on lines is close to "noise level" when compared to the number of pixels not on any lines. Thus, techniques that depend solely on histogram/PDF analysis will not perform well for most natural images.

Anisotropic Line Filtering

In an edge map with some straight lines in it, the immediate neighboring region of an edge pixel on a line shows a different pattern than the immediate neighborhood of an edge pixel not on a line. One observation is that a line edge pixel features less isotropic surroundings, because there are more strong edge pixels along the direction of the line, than along the direction perpendicular to the line. The immediate neighboring region of a non-line edge pixel has a more isotropic surrounding neighborhood of edge pixels, A second observation is that an edge pixel that is surrounded in all directions by many other edge pixels is unlikely to be on a line.

Figure 5:
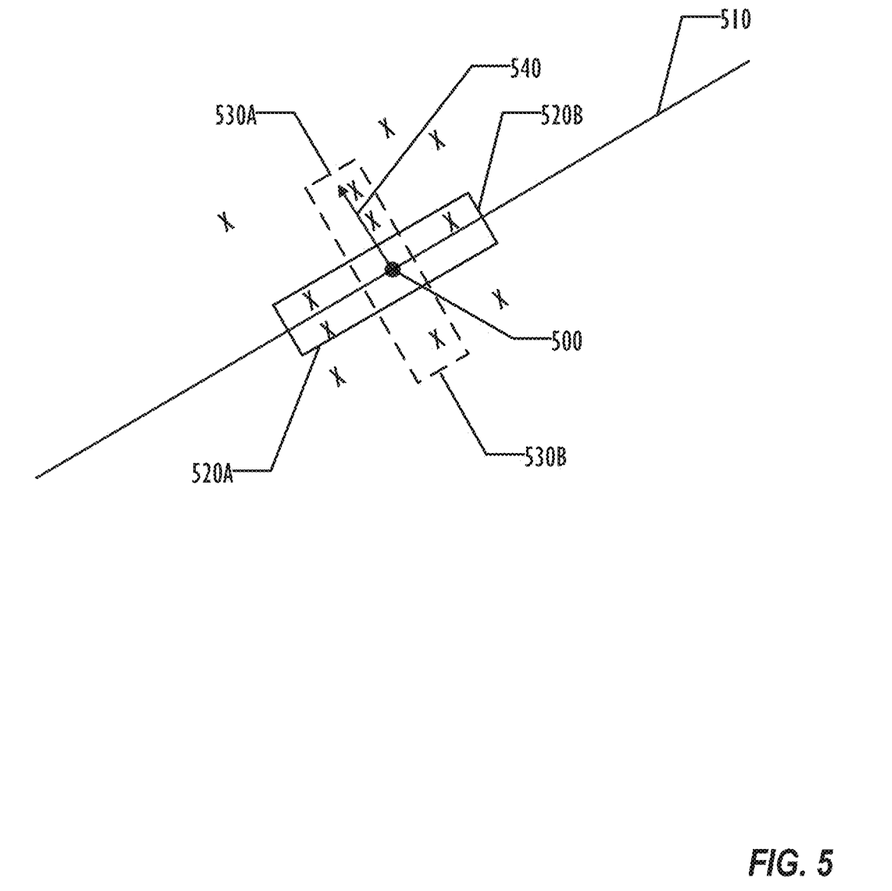
FIG. 5 is a graph illustrating a technique for anisotropic line filtering according to one embodiment.

Starting from these two observations, rectangular bounding boxes may be used to decide whether a pixel is a line edge pixel. As illustrated in FIG. 5, two bounding boxes may be used according to one embodiment. Bounding box 520 is defined around pixel 500 that may be on line 510, such than box 520 is an area perpendicular to the edge pixel gradient. Bounding box 530 is defined collinear to the edge pixel gradient. The size of boxes 520 and 530 may be based on the size or dimensions of the image. In one embodiment, typical sizes are 3 pixels by 7 pixels or 5 pixels by 7 pixels. In the illustration, the other edge pixels in the neighborhood of pixel 500 are designated with an X.

The anisotropic line filtering technique finds the gradient for each pixel in box 520 and evaluates how similar the gradients are in that box. Similarly, the anisotropic line filter evaluates how similar the gradients are in box 530. If the gradients for pixels in either or both box 520 and box 530 are approximately equal, then the pixel 500 may be on a line and is retained in the edge map. If the gradients for pixels in both box 520 and box 530 are not similar, then pixel 500 is unlikely to be on a line and may be pruned from the edge map.

In one embodiment, the determination of the similarity of the gradients in boxes 520 and 530 may be accomplished by considering the number of pixels in parts of each of box 520 and 530. Box 520 is broken into portion 520A and portion 520B, divided on the gradient direction of pixel 500. Similarly box 530 is broken into portion 530A and portion 530B. The number of edge pixels in each portion may be counted. If there are no pixels in one of the portions 520A and 520B, then pixel 500 may be retained in the edge map. Similarly, if there are no pixels in one of the portions 530A and 530B, pixel 500 may be retained. If the number of pixels in one of the portions of box 520 or 530 significantly differs from the number of pixels in the other portion of the box, pixel 500 may be retained. However, if portions 520A and 520B contain approximately equal numbers of pixels, pixel 500 is unlikely to be on a line and may be pruned from the edge map. Similarly, if portions 530A and 530B contain approximately equal numbers of pixels, pixel 500 may be pruned. This similarity determination technique is illustrative and by way of example only, and other similarity determinations may be performed as desired.

Figure 6:
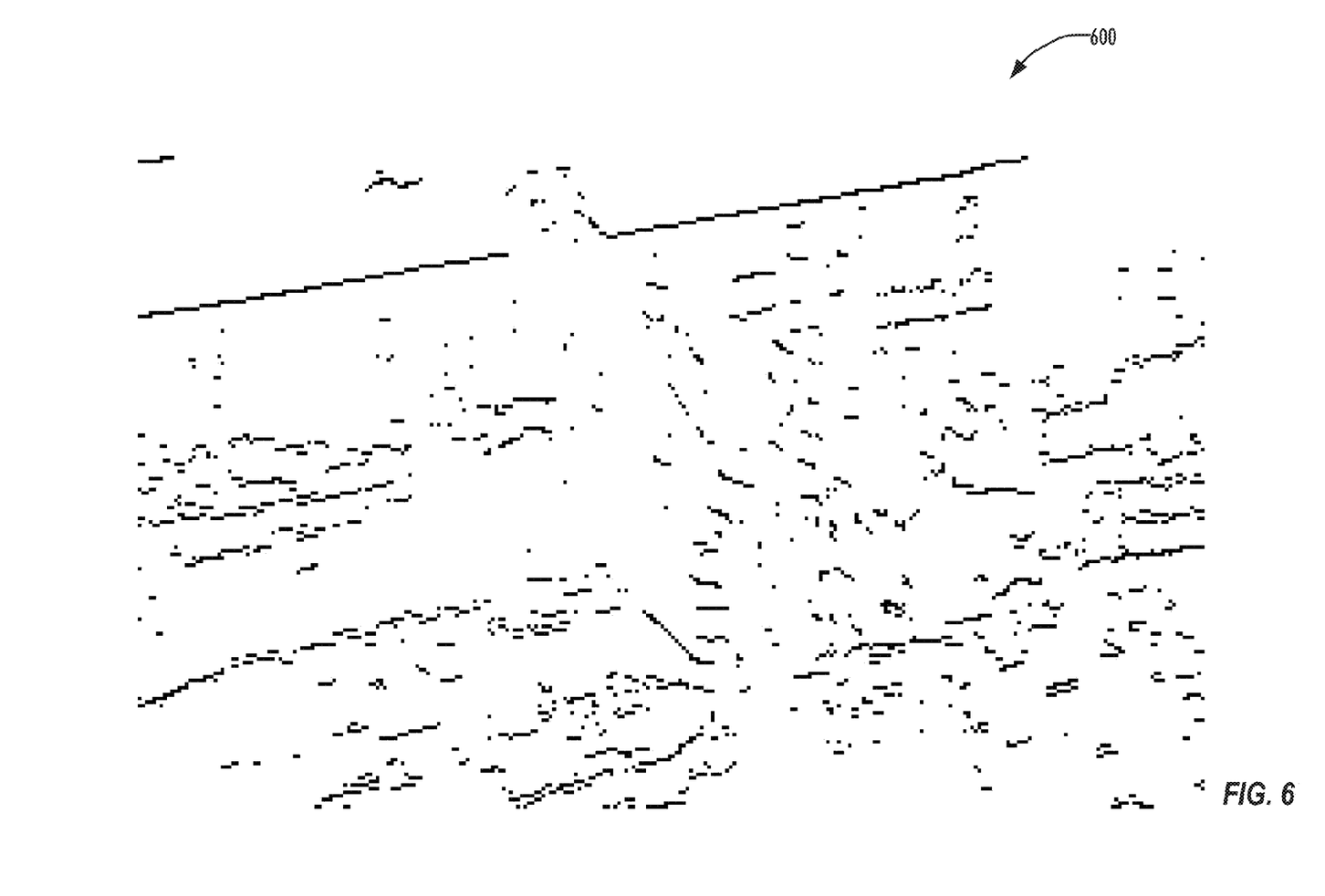
FIGS. 6 and 7 are filtered edge maps according to one embodiment illustrating an effect of using different window sizes.
Figure 7:
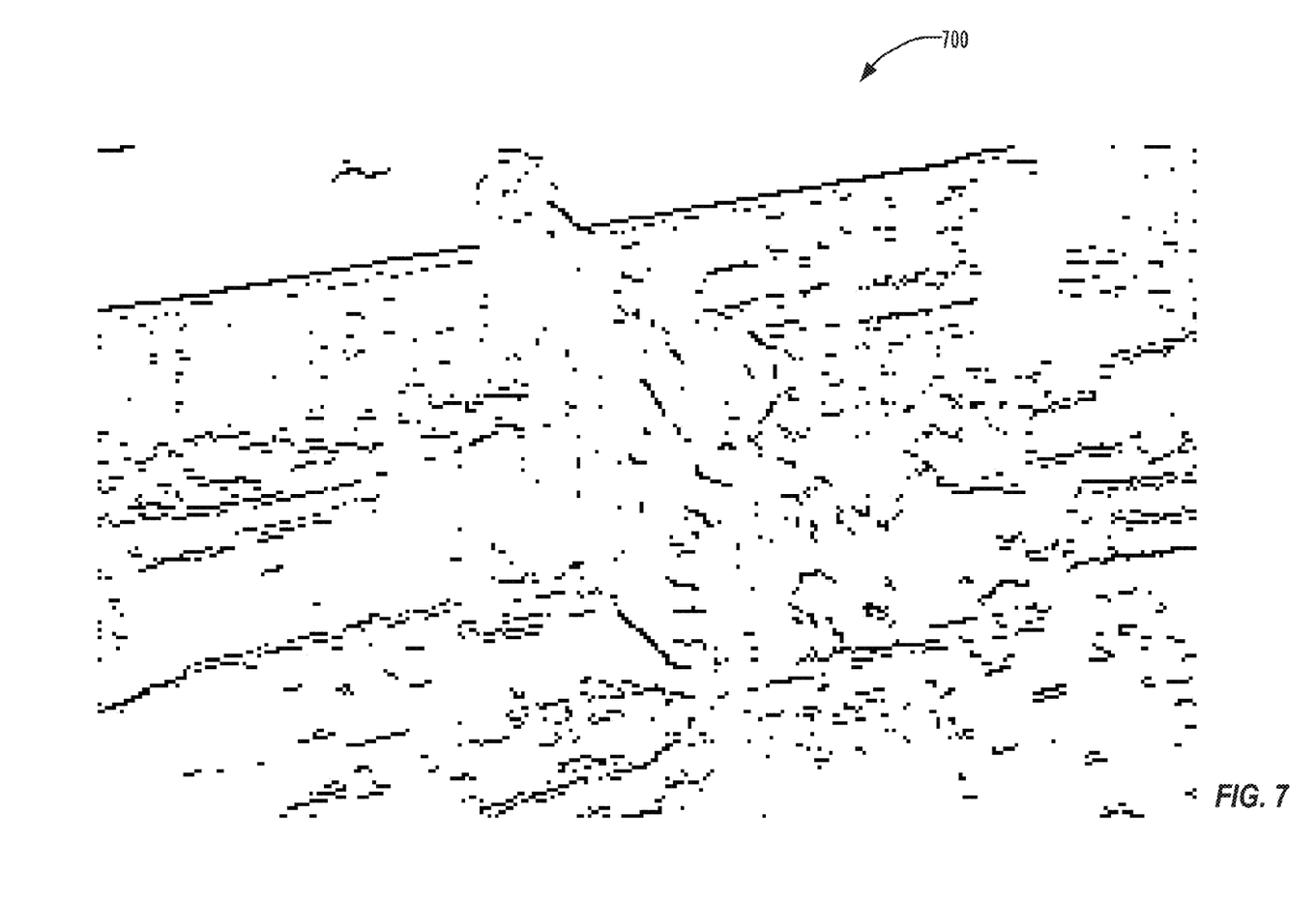

FIGS. 6 and 7 illustrate the results of line filtering the edge map 200 of FIG. 2 according to one embodiment. FIGS. 6 and 7 illustrate the effect of choosing different size boxes 520 and 530. FIG. 6 illustrates an edge map 600 after a line filter that involved the use of a 7×11 window, while FIG. 7 illustrated an edge map 700 after a line filter that used a 5×9 window. The 5×9 window pruned additional edge pixels over the 7×11 window. In both examples, the number of noise edge pixels has been reduced significantly over the original edge map 200. However, applying a Hough transform, whether a classic Hough transform (HT), a randomized Hough transform (RHT), or a progressive probabilistic Hough transform (PPHT), or any other type of line detection technique on the edge maps 600 or 700 may still lead to either false detections or missing the desired lines.

To reduce the noise edge pixels even further, a density analysis (440) followed by a connected component analysis (450) may be performed in one embodiment.

Gradient Angle Density Based Edge Pruning

Gradient angle information has been used in the past to reduce the complexity of line detection, but in a quite limited way. The line detection techniques of RHT and probabilistic Hough transforms (PHT) need prior information in terms of probabilistic parameters and are iterative in nature. They are also prone to choosing non-collinear or noise edges. PPHT also uses gradient information, but is used only to trace the line after a partial peak is detected in the Hough space. If the number of collinear edge pixels is much less than the number of non-collinear edge pixels, PPHT tends to detect the wrong lines.

Figure 8:
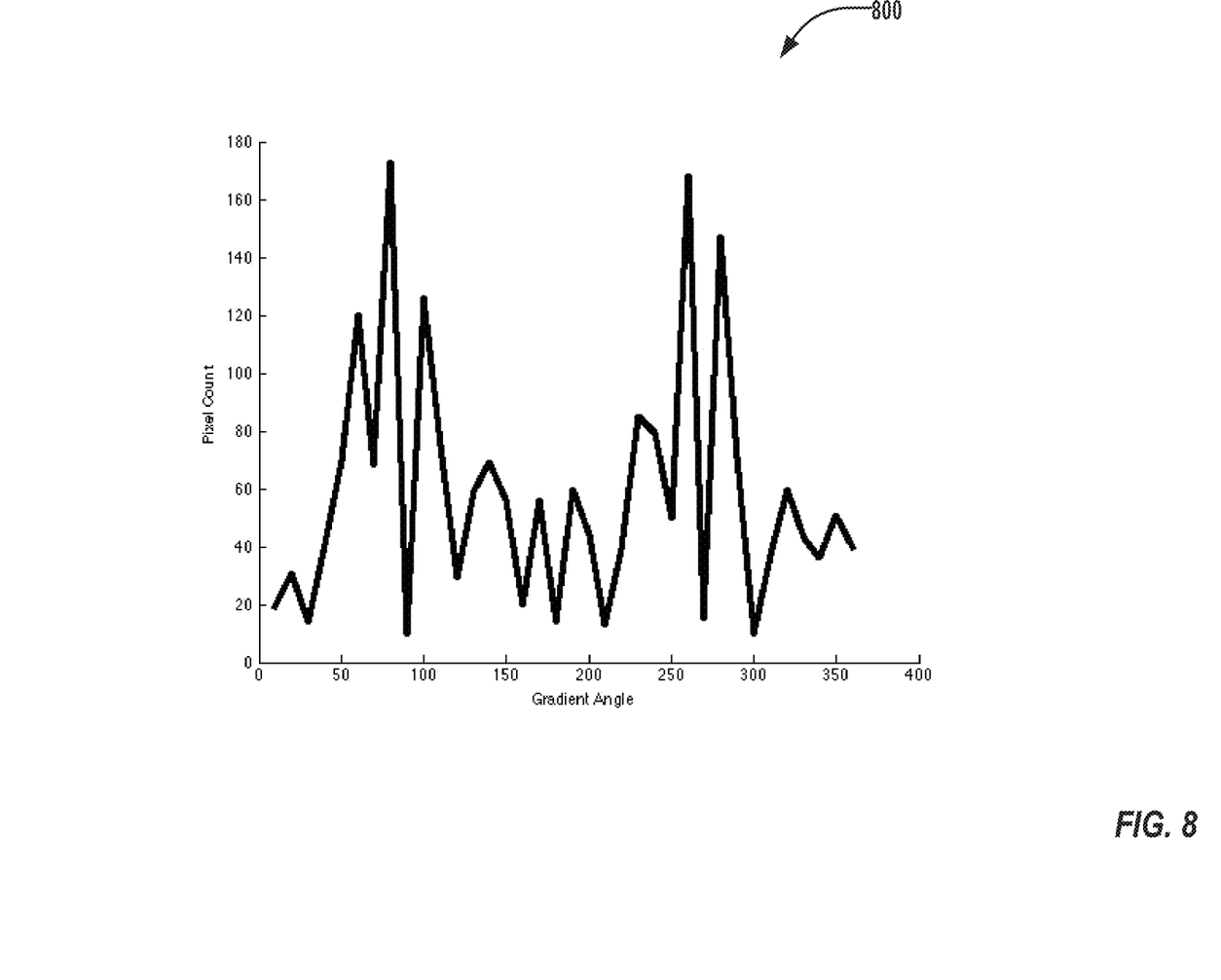
FIG. 8 is a histogram of gradient angles calculated from the edge map of FIG. 7

In one embodiment, instead of using the gradient information during the Hough transform (460), the gradient angle is used in the pre-processing phase 470. All of the pixels on a straight line will have similar gradient angles, and the line will tend to form a local peak of a histogram of gradient angles. But as illustrated by the histogram 800 of gradient angles in FIG. 8, the histogram 800 is not smooth and tends to have many local maxima. Additionally, small noise on the image could push one edge pixel from one bin to another in the histogram 800.

To take the noise into consideration, in one embodiment, a PDF may be constructed using kernel-based density estimation instead of using a histogram. Assuming that n edge gradients $(x_1, x_2, \ldots, x_n)$ are drawn from some distribution with an unknown density f. The kernel density estimator in one embodiment may be calculated using the equation $$f_h(x) = \frac{1}{n}\sum_{i=1}^{n} K(x - x_i) = \frac{1}{nh}\sum_{i=1}^{n} K\left(\frac{x - x_i}{h}\right)$$

where K( ) is the kernel function, and h>0 is a smoothing parameter called bandwidth. The density estimation calculation can be dramatically sped up by careful choice of the bandwidth, as well as using a simplified kernel function K( ).

In other embodiments, the histogram of gradient angles is calculated and any desired curve fitting technique may be used to create the PDF.

Figure 9:
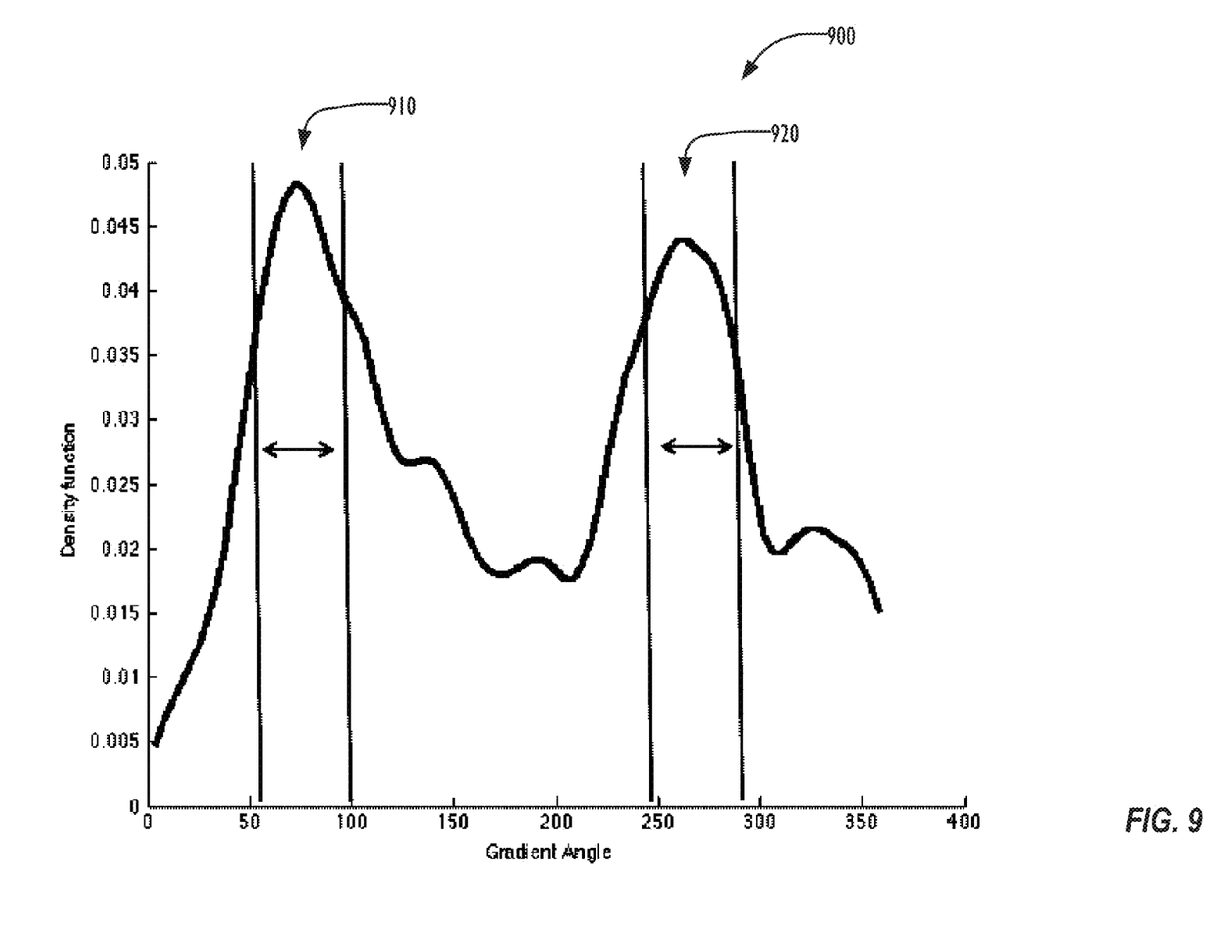
FIG. 9 is a graph illustrating a probability density function according to one embodiment.

The PDF of the gradient angle distribution of FIG. 7 is illustrated as graph 900 in FIG. 9. Two prominent peaks in the PDF 910 and 920 are visible in graph 900. By keeping only the edge pixels whose gradient angles fall into the region close to peaks 910 and 920, and further pruning the edge map by using connected component analysis in block 450 as described below, a much cleaner edge map 1000 may be produced, as illustrated by graph 1000 in FIG. 10.

In one embodiment, the density analysis technique considers each peak in the PDF as a Gaussian curve. The bounds for regions close to the peak may be set to at any desired distance from the peak. In one embodiment, the bounds are set at ±3 standard deviations from the peak.

In one embodiment, peaks may be selected based on their significance. The area under each peak is calculated, and peaks with an area greater than a predetermined threshold value may be considered a prominent peak. In one embodiment, a threshold value in the range of 10-15% of the total area under the PDF curve.

In some embodiments, the subject matter of the image may be known and may be used to select or ignore peaks in the PDF. For example, if the subject matter of the image is such that horizontal lines are expected, then that information may be used to only consider peaks near a 90° gradient angle. Such subject-matter based selection or ignoring of peaks in the PDF may significantly improve computation requirements and the accuracy of the result. For example, where the image was created by a smartphone containing a camera, in one embodiment only regions surrounding approximately 90° peaks are considered, to keep pixels that may be part of horizontal lines.

Figure 10:
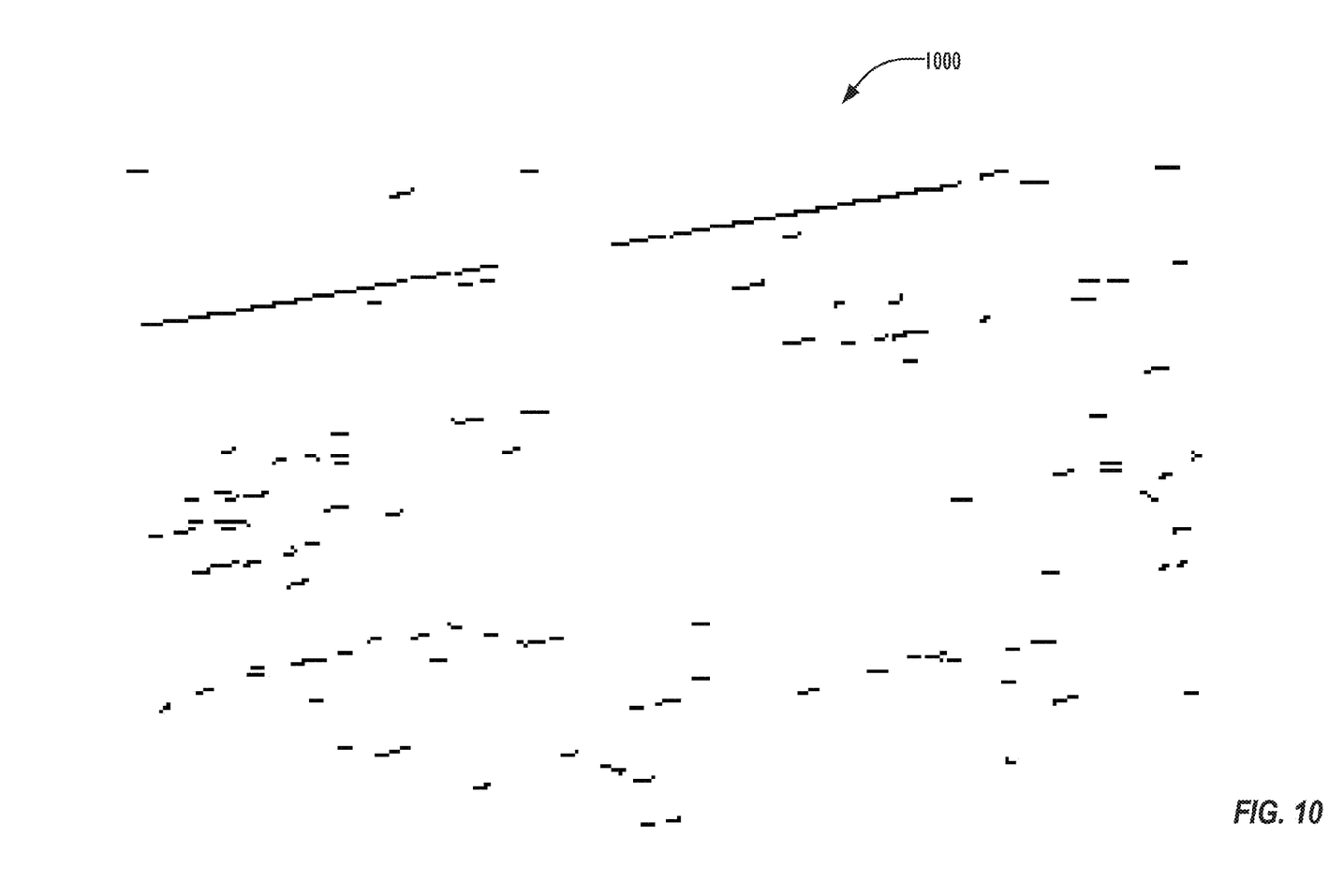
FIGS. 10 and 11 are edge maps that have been pruned by density analysis and connected component analysis according to one embodiment.
Figure 11:
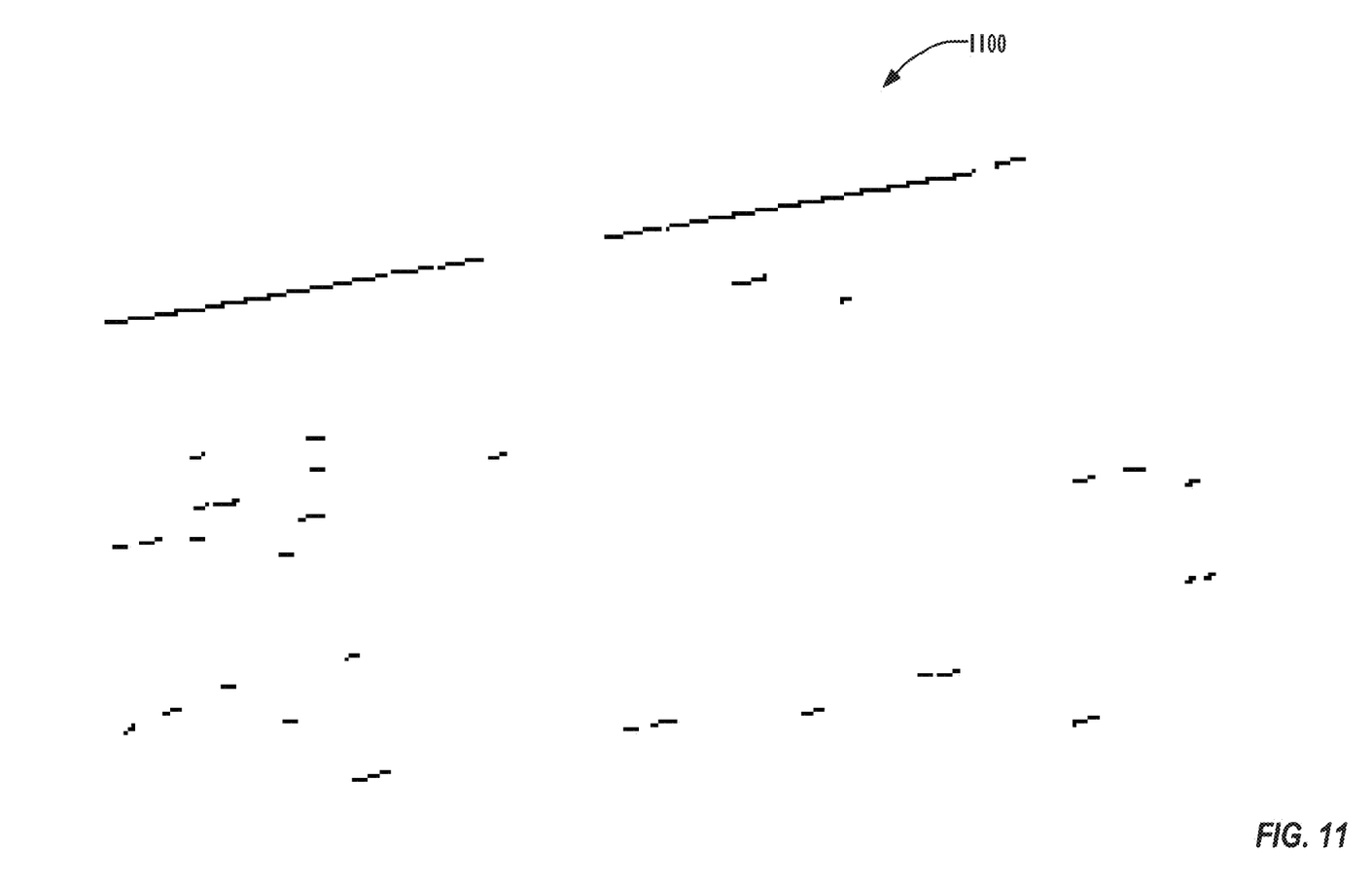

If an approximate orientation of a line to be detected is known, then only the peak close to that particular orientation may be kept. In FIG. 10, an orientation corresponding to peak 910 is desired, so only the edge pixels associate with the bounded peak 910 are kept in the edge map, resulting in edge map 1100 as illustrated in FIG. 11.

Connected Component Analysis

After the line filtering and density analysis described above, the edge map 1000 may have many fewer non-collinear edge pixels. In addition, most of the non-collinear edge pixels are broken into very small groups in terms of connectivity. Applying connected component analysis to an edge map may yield many very small connected components including non-collinear edge pixels, and strongly connected components including the collinear edge pixels. Thus, connected component analysis allows removing additional non-collinear edge pixels. In one embodiment, an acceptable range for connectedness may be components with at least 2-3 pixels, although other embodiments may use different ranges, based on the application. The use of a connected component analysis technique allows removing additional singleton pixels that if left in the edge map would increase the computational requirements and decrease the accuracy of the line detection technique. Any desired connected component analysis technique may be used.

Line Detection

Figure 12:
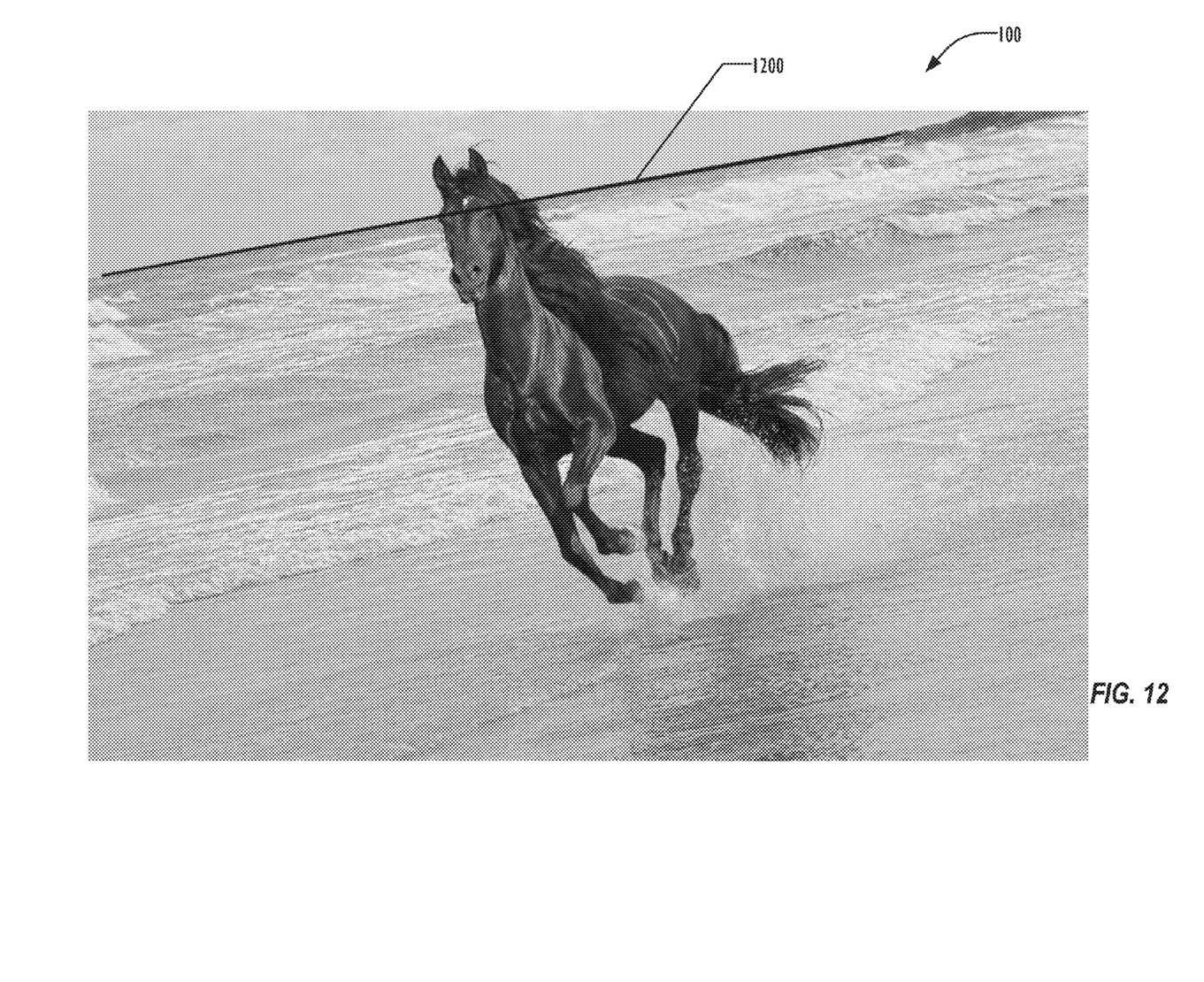
FIG. 12 is an image illustrating a line detected by a line detection technique using the edge map of FIG. 11 according to one embodiment.

After the pre-processing phase 470 has resulted in a cleaned edge map such as the edge map 1100 illustrated in FIG. 11, in block 460 a Hough Transform such as a PPHT (or any other desired line detection technique) may be performed using the cleaned edge map, resulting in the line 1200 detected in example image 100 illustrated in FIG. 12. In one embodiment, the line detection technique allows for automatic or semi-automatic photo straightening. For example, a user might simply tap on the detected line, and the photo may be rotated to straighten the photo along the line direction.

Implementation in an Electronic Device

FIG. 13 is a simplified functional block diagram illustrating an electronic device 1300 according to one embodiment that can implement the techniques described above. The electronic device 1300 may include a processor 1316, display 1320, microphone 1306, audio/video codecs 1302, speaker 1304, communications circuitry 1310, an image sensor with associated camera hardware 1308 for performing image capture, user interface 1318, memory 1312, storage device 1314, and communications bus 1322. Processor 1316 may be any suitable programmable control device and may control the operation of many functions, such as the generation and/or processing of image data, as well as other functions performed by electronic device 1300. Processor 1316 may drive display 1320 and may receive user inputs from the user interface 1318. An embedded processor provides a versatile and robust programmable control device that may be utilized for carrying out the disclosed techniques.

Storage device 1314 may store media (e.g., image and video files), software (e.g., for implementing various functions on device 1300), preference information, device profile information, and any other suitable data. Storage device 1314 may include one more storage mediums for tangibly recording image data and program instructions, including for example, a hard-drive, permanent memory such as ROM, semi-permanent memory such as RAM, or cache. Program instructions may comprise a software implementation encoded in any desired language (e.g., C or C++).

Memory 1312 may include one or more different types of memory which may be used for performing device functions. For example, memory 1312 may include cache, ROM, and/or RAM. Communications bus 1322 may provide a data transfer path for transferring data to, from, or between at least storage device 1314, memory 1312, and processor 1316. Although referred to as a bus, communications bus 1322 is not limited to any specific data transfer technology. User interface 1318 may allow a user to interact with the electronic device 1300. For example, the user interface 1318 can take a variety of forms, such as a button, keypad, dial, a click wheel, or a touch screen.

In one embodiment, the electronic device 1300 may be an electronic device capable of processing and displaying media, such as image and video files. For example, the electronic device 1300 may be a device such as such a mobile phone, personal data assistant (PDA), portable music player, monitor, television, laptop, desktop, and tablet computer, or other suitable personal device. In other embodiments, the electronic device 1300 may be dedicated to the barcode scanning functionality.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method of detecting lines in an image, comprising:
pre-processing the image using a processor, comprising:
generating an edge map of the image; and
removing non-collinear edge pixels from the edge map to obtain a cleaned edge map, comprising:
filtering the edge map using an anisotropic line filter, pruning edge pixels from the edge map based on a density analysis of the edge map, and
removing the non-collinear edge pixels from the edge map based on a connected component analysis of the edge map; and
detecting a line in the edge map.

2. The method of claim 1, wherein pruning edge pixels from the edge map based on a density analysis of the edge map comprises:
generating a histogram of gradient angles in the edge map;
fitting a probability density function to the histogram; and
removing edge pixels not corresponding to a region surrounding a peak in the probability density function.

3. The method of claim 2, wherein removing edge pixels not corresponding to a region surrounding a peak in the probability density function comprises:
selecting a peak of the probability density function with an area greater than a predetermined threshold value.

4. The method of claim 3, wherein the predetermined threshold value comprises a predetermined portion of a total area under the probability density function.

5. The method of claim 1, wherein pruning edge pixels from the edge map based on a density analysis of the edge map comprises:
constructing a probability density function from a kernel-based density estimator.

6. The method of claim 1, wherein filtering the edge map using an anisotropic line filter comprises:
defining a first bounding box around a candidate edge pixel, collinear to an edge pixel gradient at the candidate edge pixel;
defining a second bounding box around the candidate edge, perpendicular to the edge pixel gradient at the candidate edge pixel; and
determining whether edge pixel gradient is similar to edge pixel gradients for other pixels in the first bounding box and whether the edge pixel gradient is similar to edge pixel gradients for other pixels in the second bounding box.

7. The method of claim 6, wherein determining whether edge pixel gradient is similar to edge pixel gradients for other pixels in the first bounding box and whether the edge pixel gradient is similar to edge pixel gradients for other pixels in the second bounding box further comprises:
removing the candidate edge pixel from the edge map if edge pixel gradient is dissimilar to edge pixel gradients for other pixels in the first bounding box and the edge pixel gradient is dissimilar to edge pixel gradients for other pixels in the second bounding box.

8. The method of claim 6, wherein determining whether edge pixel gradient is similar to edge pixel gradients for other pixels in the first bounding box and whether the edge pixel gradient is similar to edge pixel gradients for other pixels in the second bounding box further comprises:
dividing the first bounding box into a first portion and a second portion;
dividing the second bounding box into a third portion and a fourth portion;
removing the candidate edge pixel from the edge map if the first portion and the second portion contain approximately equal numbers of edge pixels; and
removing the candidate edge pixel from the edge map if the third portion and the fourth portion contain approximately equal numbers of edge pixels.

9. The method of claim 1, wherein removing non-collinear edge pixels from the edge map comprises:
   filtering the edge map using an anisotropic line filter.

10. The method of claim 1, wherein removing non-collinear edge pixels from the edge map comprises:
   pruning edge pixels from the edge map based on a density analysis of the edge map.

11. The method of claim 1, wherein removing non-collinear edge pixels from the edge map comprises:
   removing non-collinear edge pixels from the edge map based on a connected component analysis of the edge map.

12. The method of claim 1, wherein detecting a line in the cleaned edge map comprises:
   detecting a line using a progressive probabilistic Hough transform.

13. A non-transitory program storage device, readable by a programmable control device, comprising instructions stored thereon for causing the programmable control device to:
   receive an image from an image sensor;
   pre-process the image using a processor, wherein the processor comprises instructions for causing the programmable control device to:
      convert the image into an edge map of the image; and
      prune non-collinear edge pixels from the edge map to obtain a cleaned edge map,
         wherein the instructions for causing the programmable control device to prune non-collinear edge pixels from the edge map comprises instructions for causing the programmable control device to:
         filter the edge map using an anisotropic line filter,
         prune edge pixels from the edge map based on a density analysis of the edge map, and
         remove the non-collinear edge pixels for the edge map based on a connected component analysis of the edge map; and
   detect a line in the edge map.

14. The non-transitory program storage device of claim 13, wherein the instructions for causing the programmable control device to prune non-collinear edge pixels from the edge map comprise instructions for causing the programmable control device to:
   remove edge pixels from the edge map based on a density analysis of the edge map.

15. The non-transitory program storage device of claim 13, wherein the instructions for causing the programmable control device to remove edge pixels from the edge map based on a density analysis of the edge map comprise instructions for causing the programmable control device to:
   fit a probability density function to a histogram of gradient angles in the edge map; and
   remove edge pixels not corresponding to a region surrounding a peak in the probability density function.

16. The non-transitory program storage device of claim 13, wherein the instructions for causing the programmable control device to remove edge pixels from the edge map based on a density analysis of the edge map comprise instructions for causing the programmable control device to:
   construct a probability density function from a kernel-based density estimator;
   select a peak of the probability density function with an area greater than a predetermined threshold value; and
   remove edge pixels not corresponding to a region of the probability density function on either side of the peak.

17. The non-transitory program storage device of claim 13, wherein the instructions for causing the programmable control device to prune non-collinear edge pixels from the edge map comprise instructions for causing the programmable control device to:
   remove edge pixels from the edge map based on a connected component analysis of the edge map.

18. The non-transitory program storage device of claim 13, wherein the instructions for causing the programmable control device to prune non-collinear edge pixels from the edge map comprise instructions for causing the programmable control device to:
   filter the edge map with an anisotropic line filter;
   prune edge pixels from the edge map based on a density analysis of the edge map; and
   remove edge pixels from the edge map based on a connected component analysis of the edge map.

19. The non-transitory program storage device of claim 13, wherein the instructions for causing the programmable control device to detect a line in the cleaned edge map comprise instructions for causing the programmable control device to perform a Hough transform on the edge map.

20. An apparatus, comprising:
   an image sensor;
   a programmable control device; and
   a memory coupled to the programmable control device, wherein instructions are stored in the memory and cause the programmable control device to:
      pre-process the image using a processor, wherein the processor comprises instructions that cause the programmable control device to:
         generate an edge map of an image captured by the image sensor;
         filter the edge map using an anisotropic line filter;
      obtain a cleaned edge map using the processor, wherein the processor comprises instructions that clause the programmable device to:
         perform a density analysis of the edge map;
         perform a connected component analysis of the edge map;
         prune edge pixels from the edge map based on a density analysis of the edge map, and
         remove the non-collinear edge pixels from the edge map based on a connected component analysis of the edge map; and
      detect a line in the edge map with a Hough transform.

21. The apparatus of claim 20, wherein the instructions to cause the programmable control device to generate an edge map of an image captured by the image sensor comprise instructions for causing the programmable control device to:
   convert the image into an edge map of the image with a Canny edge detector.

22. The apparatus of claim 20, wherein the Hough transform is a progressive probabilistic Hough transform.

23. The apparatus of claim 20, wherein the density analysis employs a kernel-based density estimator.

* * * * *

UNITED STATES PATENT AND TRADEMARK OFFICE
CERTIFICATE OF CORRECTION

| | | |
|---|---|---|
| PATENT NO. | : 9,245,194 B2 | Page 1 of 1 |
| APPLICATION NO. | : 13/366613 | |
| DATED | : January 26, 2016 | |
| INVENTOR(S) | : Zehang Sun | |

It is certified that error appears in the above-identified patent and that said Letters Patent is hereby corrected as shown below:

Claims

Column 8, claim 6, line 38: Insert the word --the-- after the phrase "determining whether";

Column 8, claim 7, line 43: Insert the word --the-- after the phrase "determining whether";

Column 8, claim 8, line 53: Insert the word --the-- after the phrase "determining whether";

Column 9, claim 14, line 38: Insert the word --cleaned-- after the phrase "detect a line in the";

Column 10, claim 20, line 49: Insert the word --cleaned-- after the phrase "detect a line in the".

Signed and Sealed this
Twenty-eighth Day of June, 2016

Michelle K. Lee
*Director of the United States Patent and Trademark Office*